United States Patent
Galin et al.

(10) Patent No.: US 10,718,609 B2
(45) Date of Patent: Jul. 21, 2020

(54) VOLUMETRIC ESTIMATION METHODS, DEVICES, AND SYSTEMS

(71) Applicant: WISETECH GLOBAL LIMITED, Alexandria, New South Wales (AU)

(72) Inventors: Natalia Galin, Alexandria (AU); Richard White, Alexandria (AU)

(73) Assignee: Wisetech Global Limited, Alexandria (AU)

( * ) Notice: Subject to any disclaimer, the term of this patent is extended or adjusted under 35 U.S.C. 154(b) by 0 days.

(21) Appl. No.: 15/751,395

(22) PCT Filed: Aug. 10, 2016

(86) PCT No.: PCT/AU2016/050722
§ 371 (c)(1),
(2) Date: Feb. 8, 2018

(87) PCT Pub. No.: WO2017/024347
PCT Pub. Date: Feb. 16, 2017

(65) Prior Publication Data
US 2018/0231371 A1    Aug. 16, 2018

(30) Foreign Application Priority Data
Aug. 10, 2015   (AU) ................................ 2015903200

(51) Int. Cl.
*G01B 11/25*  (2006.01)
*G06T 7/80*   (2017.01)
(Continued)

(52) U.S. Cl.
CPC .......... *G01B 11/2504* (2013.01); *G01B 11/00* (2013.01); *G01B 11/02* (2013.01);
(Continued)

(58) Field of Classification Search
CPC .. G01B 11/2504; G01B 11/02; G01B 21/042; G01B 11/00; G06T 7/62; G06T 7/80; G06T 5/006; G01C 11/06; G01C 11/30
See application file for complete search history.

(56) References Cited

U.S. PATENT DOCUMENTS 5,459,794 A *  10/1995  Ninomiya ............ G01B 11/022
                                                     348/126
6,404,506 B1 *  6/2002  Cheng ................... G01B 11/04
                                                     250/559.22

(Continued)

OTHER PUBLICATIONS

PCT International Search Report and Written Opinion, PCT/AU2016/050722, dated Dec. 7, 2016, 9 Pages.

*Primary Examiner* — Mohamed K Amara
(74) *Attorney, Agent, or Firm* — Fenwick & West LLP (57) ABSTRACT

This disclosure relates to calibrating a volumetric estimation device for determining dimensions of an object. Two laser sources project two laser lines onto the object to form a rectangular calibration target. A camera captures an image of the rectangular calibration target and has a camera image plane and a camera image plane centre point. A processor measures the camera distortion effects to generate a filter to remove the distortion effects to approximate a pinhole camera. The camera image plane centre point and the points of projection of the laser sources are not collinear. The point of laser projection are not collinear with the camera image plane centre point. The processor uses locations of laser projected crosslines to determine a deviation angle from a direction perpendicular to the camera image plane and the distance between the camera image plane centre point and each laser source.

13 Claims, 9 Drawing Sheets

(51) Int. Cl.
  *G01B 11/00* (2006.01)
  *G06T 5/00* (2006.01)
  *G01C 11/30* (2006.01)
  *G01C 11/06* (2006.01)
  *G01B 11/02* (2006.01)
  *G01B 21/04* (2006.01)
  *G06T 7/62* (2017.01)

(52) U.S. Cl.
  CPC ............ *G01B 21/042* (2013.01); *G01C 11/06* (2013.01); *G01C 11/30* (2013.01); *G06T 5/006* (2013.01); *G06T 7/62* (2017.01); *G06T 7/80* (2017.01)

(56) References Cited

U.S. PATENT DOCUMENTS

| | | | |
|---|---|---|---|
| 7,277,187 B2 | 10/2007 | Smith et al. | |
| 9,829,309 B2 * | 11/2017 | Ge | G01B 11/22 |
| 9,841,311 B2 * | 12/2017 | McCloskey | G06Q 10/083 |
| 10,163,216 B2 * | 12/2018 | Ackley | H04N 5/225 |
| 10,249,030 B2 * | 4/2019 | McCloskey | G06K 7/10722 |
| 2004/0008259 A1 | 1/2004 | Gokturk et al. | |
| 2004/0047561 A1 * | 3/2004 | Tuda | G02B 6/12004 |
| | | | 385/39 |
| 2009/0108175 A1 * | 4/2009 | Grot | G06F 3/0317 |
| | | | 250/206.1 |
| 2011/0286007 A1 | 11/2011 | Pangrazio et al. | |
| 2012/0249939 A1 * | 10/2012 | Do | G02F 1/13363 |
| | | | 349/117 |
| 2013/0021562 A1 * | 1/2013 | Choi | G02F 1/133634 |
| | | | 349/96 |
| 2013/0033596 A1 * | 2/2013 | Crothers | G01B 21/045 |
| | | | 348/135 |
| 2014/0104416 A1 | 4/2014 | Giordano et al. | |
| 2014/0241590 A1 * | 8/2014 | Day, Jr. | G01N 15/0205 |
| | | | 382/110 |
| 2015/0009338 A1 | 1/2015 | Laffargue et al. | |
| 2015/0213702 A1 * | 7/2015 | Kimmel | G08B 21/043 |
| | | | 382/103 |
| 2015/0346494 A1 * | 12/2015 | Tanaka | G02B 27/017 |
| | | | 345/647 |
| 2017/0359573 A1 * | 12/2017 | Kim | H04N 17/002 |

* cited by examiner

VOLUMETRIC ESTIMATION METHODS, DEVICES, AND SYSTEMS

TECHNICAL FIELD

This disclosure relates to calibrating a volumetric estimation device for determining dimensions of an object.

BACKGROUND

Freight forwarding and shipping is a global business, companies all around the world are involved in the global shipping business. Conventionally, shipping charges have solely been determined by weight of the freight. A weight-based shipping system provides easy, accurate, and fast shipping charges and can be integrated into freight moving devices like a forklift or other transportation device. The shipping industry has since moved toward dimensional weighting, whereby the volume of a package is included in the transport cost.

Volume is more difficult to measure than weight. In a volume-based freight system, shippers are tasked with assigning volumes to freight with the risk of challenge from the carrier(s) and/or receiver. The industry requirements for quickly transporting freight are very high, and carriers become increasingly pressured to process freight quickly, which makes manual dimensioning of freight infeasible. Carriers and receivers highly value the correct calculation of the freight shipping costs prior to onward shipment or final destination, respectively. Shippers may under-report dimensions to decrease the cost of shipping, which causes revenue leakage for the carriers and risk of payment upon delivery for the receivers.

Volumetric apparatus' can be constructed relatively easily. However, their accuracy can be questionable. It would be beneficial were the accuracy of the measurements high, avoiding errors that could result in higher costs either to the customers or the shipper. Therefore, the freight industry could benefit from devices, methods, and systems that help dimension freight in a way that is efficient, cost-effective, and minimally interferes with the normal flow of freight traffic.

SUMMARY

Disclosed is an apparatus for calibrating a volumetric estimation device for determining dimensions of an object determining dimensions of an object, including at least a first laser source and a second laser source, each projecting at least two laser lines onto an object from a point of laser projection, to form a rectangular calibration target having crossline locations on at least a portion of the object and a camera for capturing an image of the rectangular calibration target projected onto the object, the camera having a camera image plane and a camera image plane centre point. Also disclosed are means for calibrating the camera to measure the camera distortion effects to generate a filter to remove the distortion effects so that the camera approximates a pinhole camera model, the camera configured to receive laser light, wherein the camera image plane centre point and the points of projection of the laser sources generating projected crosslines are not collinear and wherein the point of laser projection from at least one of the a first laser source and a second laser source are not collinear with the camera image plane centre point so that at least one of a first distance between the camera image plane centre point and a first laser source and a second distance between the camera image plane centre and a second laser source is unknown. Furthermore disclosed are means for utilising locations of laser projected crosslines in camera images, means for determining a deviation angle from a direction perpendicular to the camera image plane and the distance between the camera image plane centre point and laser source.

DESCRIPTION OF EMBODIMENTS

Disclosed is a manner to construct, for example from off-the-shelf parts, and tune, an device or apparatus for volumetric estimation of shipment items, and assure accurate measurement in an efficient manner to provide benefits to all aspects of the freight shipping process, including decreasing revenue leakage experienced by carriers and increasing cost certainty for receivers of shipments in a streamlined and inconspicuous manner.

The disclosed methods, devices, and systems generally can provide minimal interference with the normal flow of freight traffic and some examples can be retrofit into existing freight management infrastructure. Some examples can also integrate into freight management systems or freight logistics systems in any suitable manner.

The disclosed methods and systems use light sources, such as laser(s), and at least one digital camera to measure one or more dimensions of an object, such as freight or other shipments. When an object appears in the field of view of the sensors, the object's presence is detected and a laser pattern can be projected onto the object. The camera can detect an image of the projected laser pattern from which the object's dimensions are determined. The object's dimensions can include length, width, and depth.

Any of the object's dimensions can be stored in a database against which freight dimension information from the shipper can be compared and verified as accurate and from which various country import/export requirements can be met. In these examples, oftentimes the database is a remote computing system and the freight measurement information is transmitted over a computing network, either through a wireless or wired communication link, to the remote computing network. The remote computing network can track, verify, further analyze, store, and/or audit any of the freight information it receives.

The measured information about the freight can also be integrated into a freight management system to help organize or otherwise manage the freight shipments, such as by tracking the freight, auditing the freight, physically verifying that the freight has shipped or is in transit, and any other logistics related to the transport of the freight. The centralized freight management system can be accessible by users, such as shippers, carriers, and receivers of the freight from any location or could, alternatively, be closed and monitored by a central management system.

Many of the examples discussed in this application relate to measuring the dimensions of freight and/or objects that are transported through freight traffic. One of skill in the art will understand that the concepts for dimensioning objects, as disclosed here, can be applied in any other context in which an objects dimensions can be measured.

Figure 1:
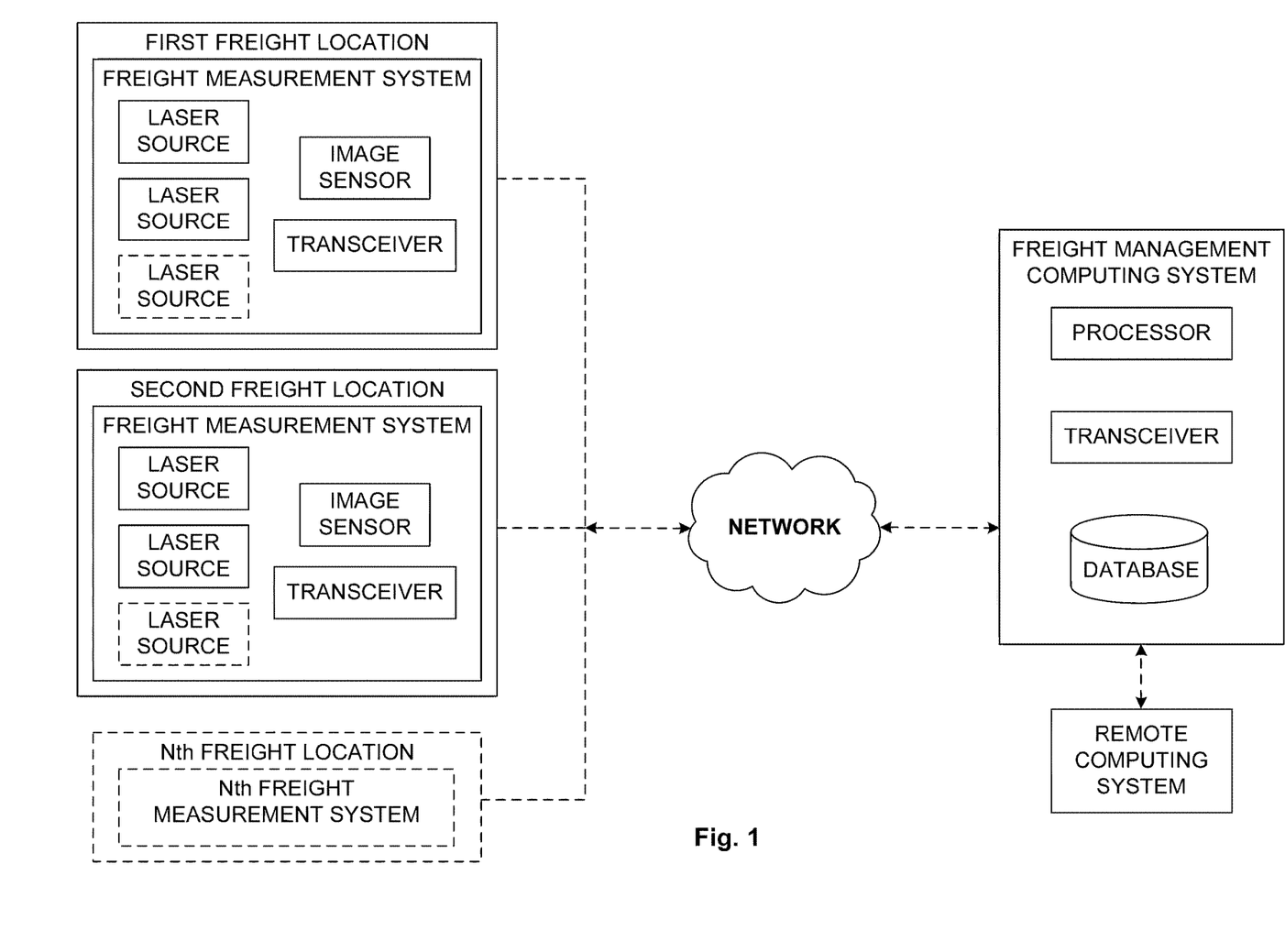
FIG. 1 depicts a system for the utilization of a volumetric estimation device.

FIG. 1 shows an example of a freight management system that includes multiple volume-based measurement systems connected to a freight management computing system over a network, such as the Internet. The network connections could be any network connections, including private and internal networks, and are not limited to Internet connections. Each of the volume-based measurement systems can be located at a different location, which in this example are labeled as the first freight location, the second freight location, and the Nth freight location. Any suitable number of locations can have a volume-based freight measurement system that is connected to the freight management computing system. The various locations of the disclosed freight measurements systems can physically be located in the same location although on different freight traffic paths or could be located at different physical locations or some combination of both options.

Each of the freight measurement systems can have at least two laser sources and optionally any additional number of laser sources along with a camera and a transceiver. The laser sources project a pattern onto an object (not shown) and the camera captures an image of the project laser pattern on the object. The captured image is transmitted through the receiver to the freight management computing system.

The freight computing management system has a transceiver, a processor, and a database. The transceiver sends and receives messages from the freight management computing system, which includes data transmissions to and from the freight measurement systems and each of the freight locations. The processor can analyze and compare the data received about the freight measurements and can further generate other data based on the freight measurement information, such as customs forms, audit reviews, legal requirements, freight tracking reports, and the like. Any data generated or calculated relating to the freight measurements at each of the freight locations can be stored in the database freight management computing system. Optionally, any of the data stored in the freight management computing system can be transmitted to another remote computing system, such as one owned or operated by a government receiving imports or transporting exports, a freight shipper, a freight carrier, and/or a receiver of the freight.

An example of the disclosed volume-based measurement devices has at least two laser sources, a camera, and a transceiver. The two laser sources are each configured to project crossline patterns onto an object. The projected pattern falls onto at least some portion or all of the object. The object can be any shape or size. The camera is configured to capture an image of the projected pattern or a portion of it that is projected onto the object. The camera can include a filter that is designed to allow only the laser light reflected from the object through to the sensor, in some examples. The transceiver is configured to transmit data that includes the captured image, and optionally other data, to a processor, such as the processor described above in the system shown in FIG. 1 or to a processor that is dedicated to the volume-based measurement device that captures the image.

The processor is configured to determine dimensions of the object, such as the object's length, width, and height. The determined dimensions of the object can be a measure of the object's true dimensions within a tolerated accuracy range. The processor has some fixed reference data from which the object dimensions can be calculated that include the known distance between the ground and camera, the known distance between the camera and one or more of the laser sources, the focal length of the camera, the principle point of the image center, and the pixel size of the camera. Various algorithms can be used to calculate the object's dimensions based on these criteria.

In some examples, the objects are cuboids and are oftentimes rectangular cuboids. However, sometimes, the objects are non-cuboid shapes and the calculations performed by the processor to determine the dimensions of the object can be based on the minimum volume box (minimum bounding box) into which the object fits. The minimum bounding boxes are all rectangular cuboids, so the calculations to determine the correct minimum bounding box can be based on the object's tallest height, the object's widest width, and the object's longest length even when the object has a surface that is sloped, curved, or otherwise non-cuboid. The size of the minimum bounding boxes can control the resulting cost of volume-based shipping.

Some objects are non-cuboid, as discussed above, or may be generally cuboid with some portion of it damaged and making a portion of the damaged cuboid a non-cuboid shape. While minimum bounding boxes are discussed here, the scope of the disclosed invention includes measuring dimensions for objects of any desired shape. The disclosed systems can detect the object's tallest height, widest width, and longest length, but can also detect the lowest height, smallest width, and shortest length or any other point along the object's height, width, and length, in alternative examples.

Figure 2:
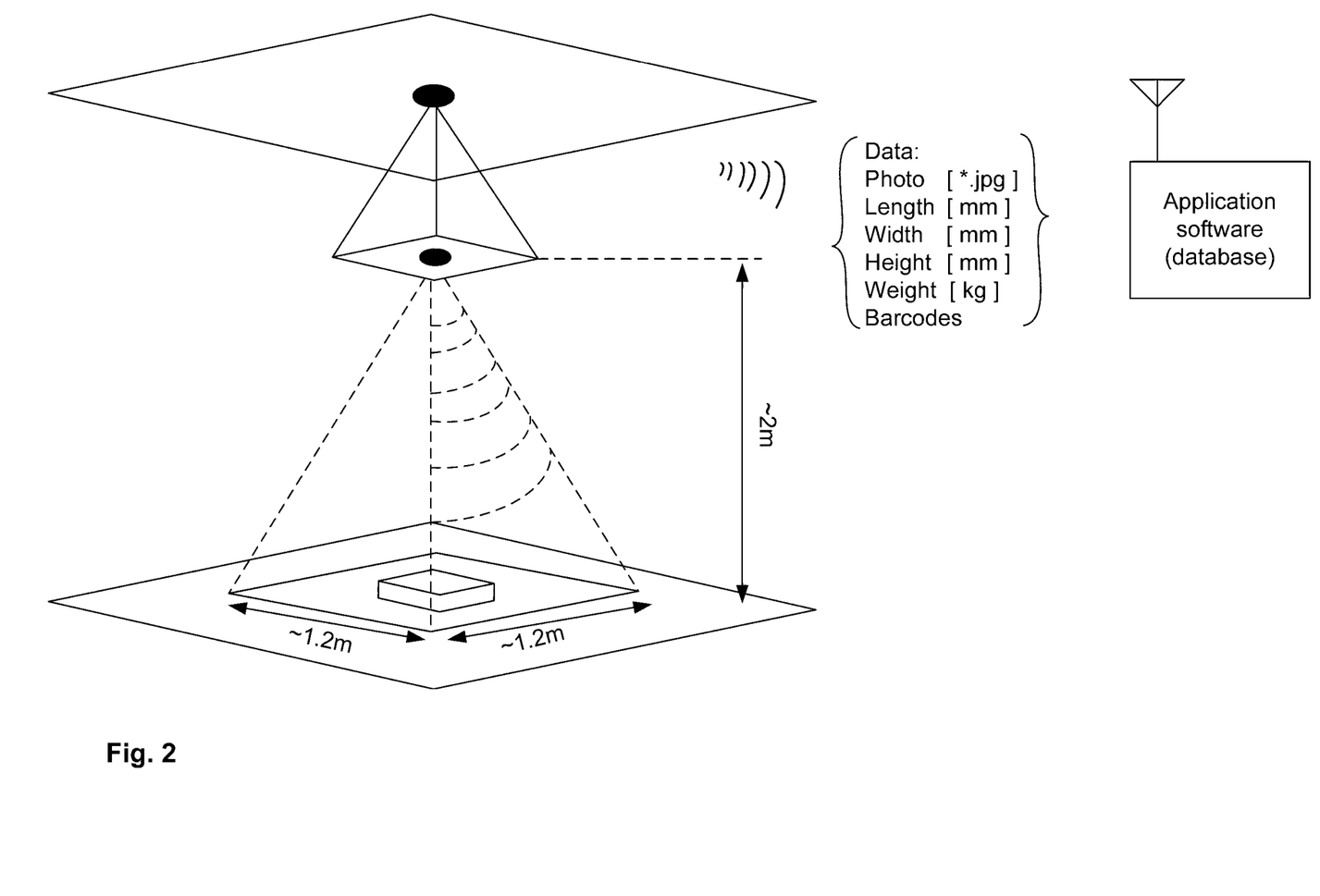
FIG. 2 depicts a volumetric estimation apparatus.

FIG. 2 shows an example volume-based measurement device that detects an object in its field of view of the camera and, using lasers and camera, helps to determine the length, width, and height of the object. The device detects an object in its field of view and estimates the object's dimensions within a desired tolerance of the true dimension values of the object. The lasers and camera can be integrated into the freight pathway at a location above a freight pad, conveyor belt, or any other location and do not require either physical contact with the objects or disruption to the freight traffic. In some example devices, the area upon which or over which the freight object is placed or travels, respectively, can also include a scale that weighs the object in addition to the device measuring its volume. While some environments are well-suited to include a scale, others are not and whether or not a scale is included is optional and can be dependent upon the environment characteristics.

In the example shown in FIG. 2, the freight measurement device is mounted on the ceiling or other surface above the object to be measured. Alternatively, the freight measurement device can also be mounted on a wall or other structure or surface nearby the object to be measured. Again referring to FIG. 2, the freight measurement device is mounted about two (2) meters spaced above the object to be measured although this distance could be greater or less than 2 meters in other examples. In yet other examples, the distance between the mounted freight measurement device and the object to be measured is adjustable, sometimes within a fixed range such as 2-4 meters away from the object.

The example measurement system shown in FIG. 2 has a floor mat upon which the object is placed. The floor mat includes a scale that can detect the weight of the object. The weight can be measured within a certain tolerated error range, as desired. The floor mat in the illustrated example shown in FIG. 2 is approximately 1.2 meters long by 1.2 meters wide and delineates the boundaries within which the object to be measured must be placed so it can be detected and its dimensions and optionally its weight can be measured. The floor mat can be any suitable size.

The device can also include a barcode scanner or RFID scanner or other like scanner that is able to scan a barcode or other identifying code or indicator that is on the object to be measured, which in some examples is in the form of a sticker or other removable, permanently-affixed, or semi-permanently affixed barcode on the object. The barcodes can help identify the object and the freight contained within the object to help track the freight's movement and help to identify that the freight is in fact physically present at the location of the measurement device. Unfortunately, some freight can be misplaced or stolen and a physical confirmation of the freight at a particular location helps to improve the security of the freight transit. Further, barcodes may indicate the type or class of freight contained in the object to be measured and such detected information can be used to classify freight for further processing or to ensure that the freight is handled according to guidelines or rules associated with a particular classification of freight.

The measurement device can detect that the freight is within its field of view in any suitable way, such as a motion or object sensor separate from or integrated into one or the other of the lasers and camera(s). Also, the camera could have a dual function to both detect the presence of an object within its field of view and to capture an image of the object with the projected laser pattern.

The detected dimensions of the object can be measured within a tolerance or error range of the true dimensions of the object. The tolerance or error range may vary for different sized objects. In some examples, the tolerance is static and is set to 5% of the true dimensions of the object. The tolerance can be based on the tolerance allowed for the minimum bounding boxes to ensure that the objects fit within the minimum bounding box within which the object is matched taking into account the possibility of the dimensions being within the tolerance values.

The example measurement device shown in FIG. 2 also has a transceiver that is able to transmit and, optionally receive, data messages. The transceiver can be wireless, as is the transceiver in the example in FIG. 2, or can be wired. The transceiver can be wirelessly coupled to the floor mat shown in FIG. 2, for example, to both send a data message to the linked scales to initiate a weight measurement of the object detected to be located on the floor mat and then to transmit the result of the weight measurement back to any other portion of the device, such as the camera or a processor, or transmit the result to any remote computing system or processor. The transceiver also provides communication between any other electronic device and the object measurement system, as desired.

As shown in FIG. 2, a captured image, dimension data, weight, and scanned ID data can be wirelessly transmitted in a data packet by the transceiver to application software. In this example, the application software also includes access to a database to store at least some portion of the data relating to the measured object. The application software processes the data in any desired way and can perform various algorithms on the received data to transform the data into valuable information about the object and any other aspect of the freight transit system.

The disclosed measurement devices can also include one or more feedback components that indicate that a function should be or has been performed, upon successful completion of one or more system or device functions, when an error appears, and/or if a system failure is detected, and the like. The feedback components can include audible and/or visual feedback, such as an audible alarm that sounds and a corresponding display that indicates the reason(s) for the triggered alarm. The feedback can be provided in the system itself through an audible or visual alarm or can be sent in a data packet through the transceiver to any other computing device, user, or tracking system. Further, a feedback component, such as a display, can be a two-way communication device between a user and the system that allows the user to control one or more aspects of the object measurement system.

Figure 3:
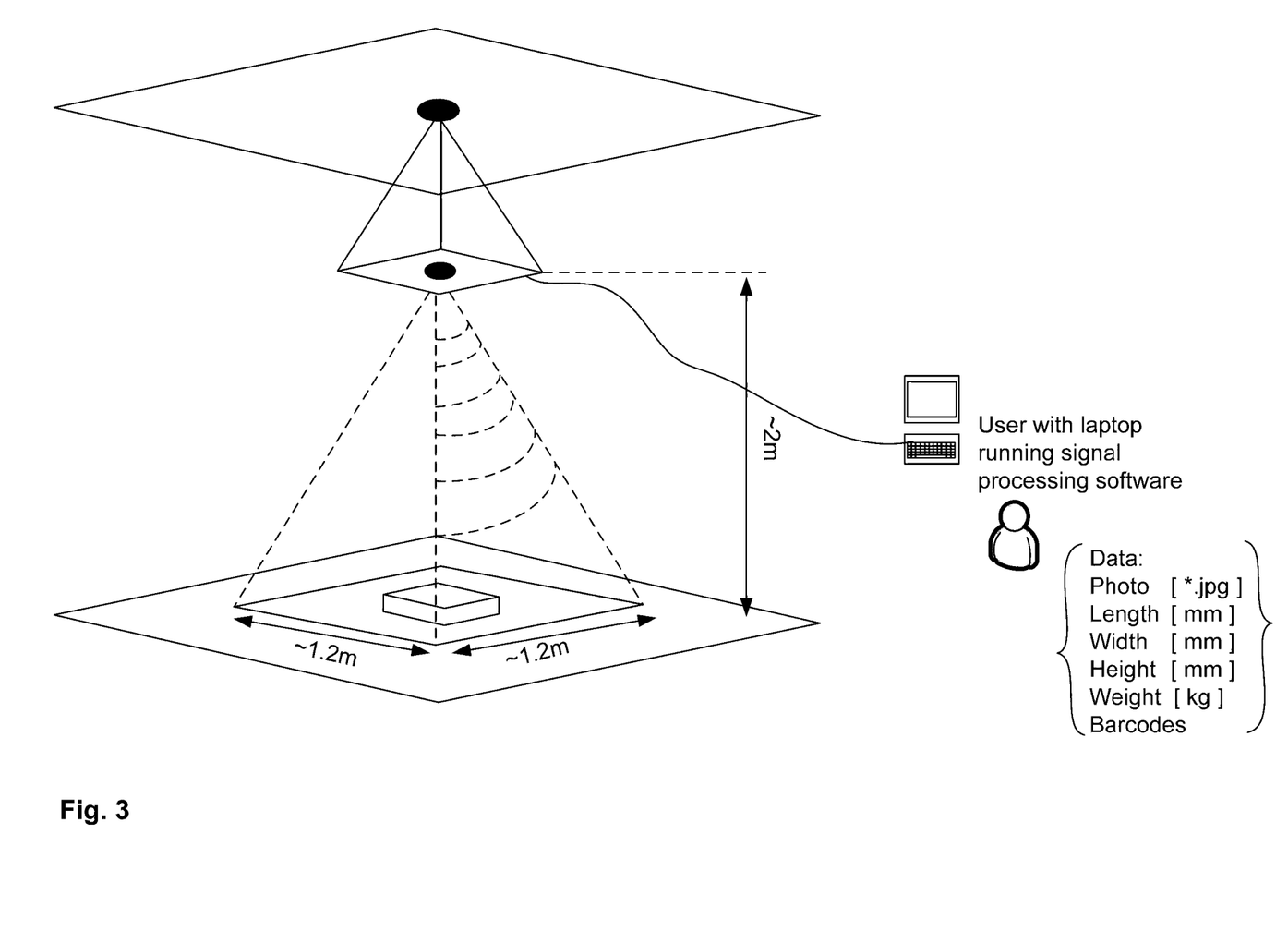
FIG. 3 depicts a volumetric estimation apparatus.

FIG. 3 shows another example measurement system having some similar components to the device shown in FIG. 2 although with some notable differences. The FIG. 3 device has similar ceiling-mounted laser sources and a camera spaced approximately 2 m above a complimentary floor mat of approximately the same size, ~1.2 m×~1.2 m, to the floor mat shown in FIG. 2 that defines the space within which the object must be placed to be measured. This example device, however, does not include a scale in the floor mat and or an ID scanner, and it is hard-wired to a user's computing device that is located physically near to the measurement device although it may be located remotely from the measurement device in other examples. The user's computing device can operate the software that processes and/or uses various algorithms on the received data to transform the data into valuable information about the object and any other aspect of the freight transit system.

The disclosed volume-based measurement system can each have at least two laser sources, which can be lasers that emit light at a wavelength within a range of 635-650 nm in some examples. The laser sources emit collimated light, which means their light rays are parallel. When emitted, the collimated laser light rays minimally disperse or do not disperse at all with distance. Therefore, when the laser sources in the disclosed volume-based measurement devices emit light, the laser pattern they project onto the object to be measured changes in a predictable way with varying distance between the object to be measured and the lasers. The emitted light from the laser sources, or at least some portion of it, is projected onto the object to be measured. It is the light that is reflected off of the object to be tested that is captured by the camera(s) and is then used to calculate the dimensions of the object.

The disclosed laser sources each project a crossline in some examples, although other patterns could be used. In the crossline pattern example, the projected crosslines form a rectangle or a rectangular mesh of known size on the object to be measured. Because of the collimated nature of the laser light, the size of the projected pattern does not change if the object size changes, and can be predicted if the lasers are moved towards or away from the object to be measured.

The dimensions of the object to be measured can be calculated from the projected laser light pattern onto the object along with various fixed characteristics of the camera(s). One example method of calculating the dimensions is to use a triangulation method. Triangulation methods exploit similar triangles to estimate the distance between the laser sources and the object being measured.

Figure 4:
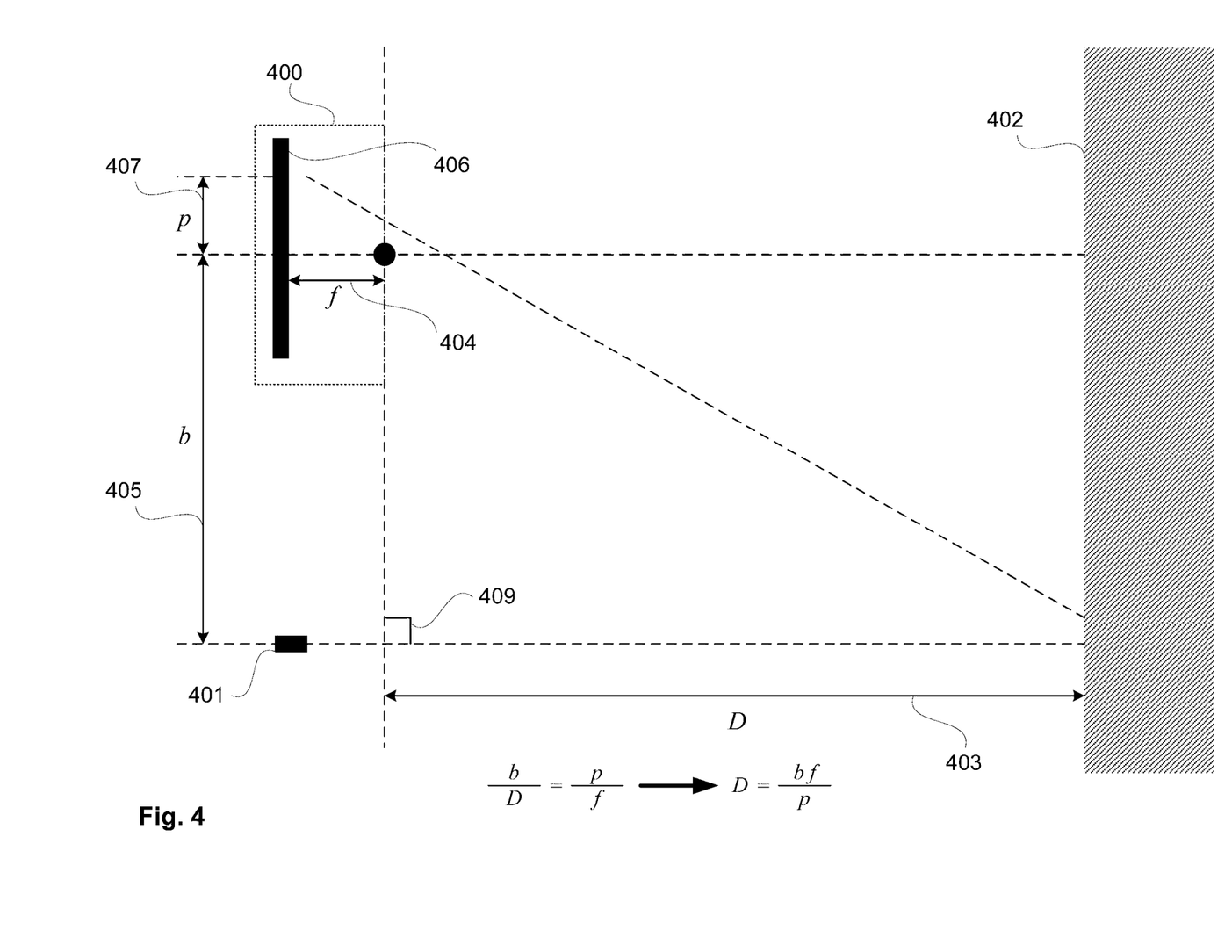
FIG. 4 shows the geometry of the camera, laser and object assembly.

FIG. 4 shows an example setup of a camera 400, laser source 401, and object 402 the distance to which 403 is to be estimated. In the event that the laser source 401 is setup so that the angle of projection 409 of its light is perpendicular to the image plane 406 of the camera 406, the distance between the center of the image plane 508, and laser source (baseline, 405) is known, the relationship between the laser source and object or the point of reflection of the laser light is:

$$D = \frac{f \cdot b}{p}$$

where D 403 the distance between the laser source and the reflecting point on the object to be measured; f is the focal length of the camera 404; b is the baseline 405 (the distance between the center (principal point, 408) of the image plane 406 of the camera and the laser source 401); and p 407 is the distance between the center of the image plane (principal point) and the reflected laser dot location in the image of the scene taken by the camera. The relationship between D and p is inversely proportional, which makes it so the closer to the laser source that the object is, the larger p is, and vice-versa.

Successful application of the triangulation method is based on the following assumptions:
(a) camera's image sensor (i.e. image plane, 406) is planar,
(b) location of the center of the camera's image sensor (i.e. principle point, 408) is known,
(c) angle of projection 409 of the laser source(s) is exactly perpendicular to the camera's image sensor,
(d) distance between the center of the laser source(s) and center of the camera's image sensor (baseline, 405) is known.

Points (a) and (b) are achieved through camera calibration (also referred to as camera resectioning) which are methods to estimate the deviations of the given physical camera embodiment from the ideal pinhole camera model. Application of camera calibration method(s) estimates the intrinsic parameters of the camera: focal length, location of the center of the image plane (principle point), distortion parameters which encapsulate deviations of the camera image sensor away from an ideal plane, as well as camera extrinsics which encapsulate the coordinate system transformations from 3D world coordinates to camera coordinates, such as camera rotation and translation matrices with respect to the world coordinates. In contrast, it is in practice difficult to achieve and/or directly measure the values of points (c) and (d).

The disclosed volume-based measurement method and devices provide a laser calibration method to estimate the angle of projection of the laser source(s) (mispointing angle), and the baseline length (distance between the center of the laser source beam, and the center of the camera image sensor) for each laser. The laser mispointing is exemplified in FIG. 5, which shows a camera 500 and laser source 501 setup separated by the baseline 502 (distance between the camera's image plane, and center of the laser source), directed towards an object 507, which has a laser projection 503 perpendicular to the camera's image plane 505, and the actual laser beam 504 projected at an angle theta 506 to the camera's image plane.

Figure 5:
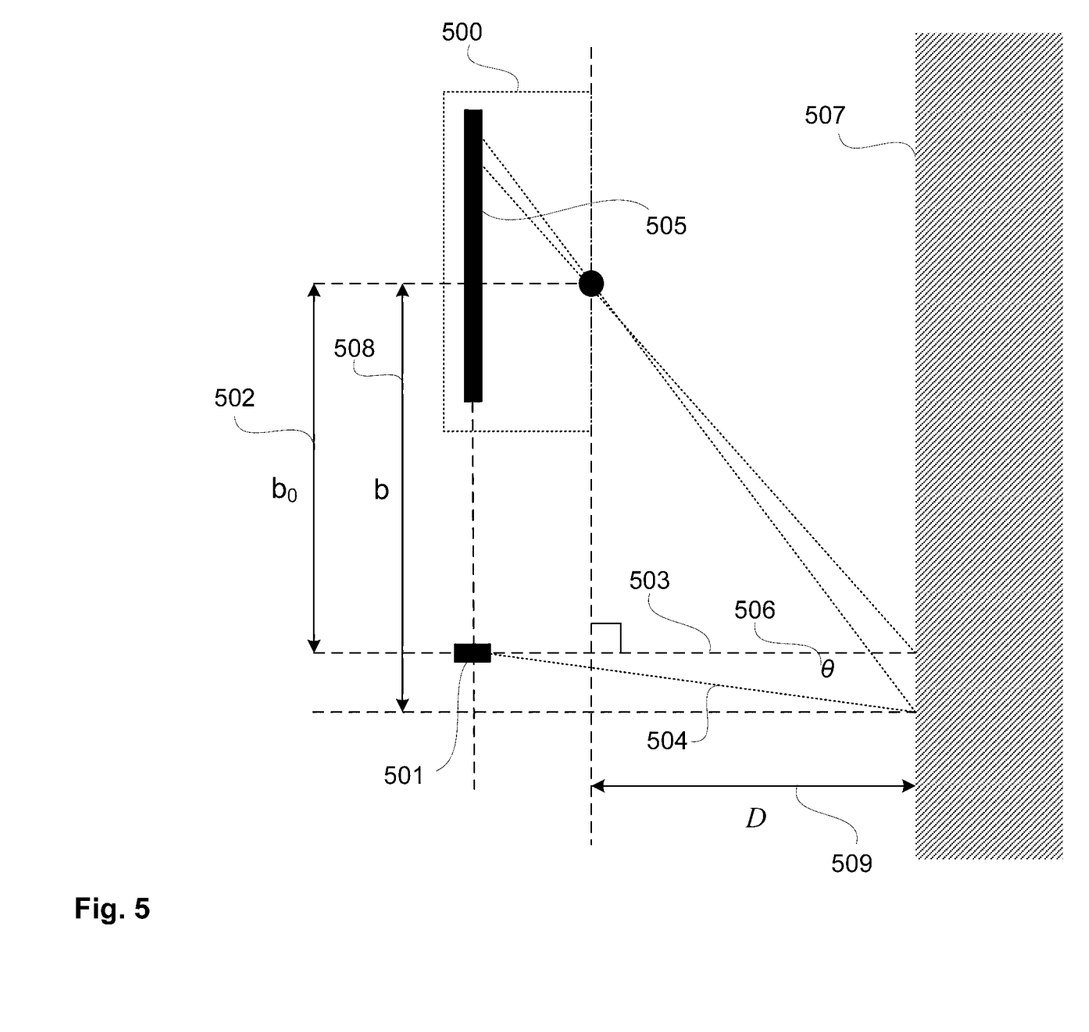
FIG. 5 shows the laser mispointing geometry.

By identifying the trigonometric relationships between the quantities: focal length, pixel location of the projected light in the acquired image, distance between the camera image plane center and laser source, and the laser mispointing angle, and exploiting these relationships the means may be found to retrieve/characterise the unknown laser mispointing. By making these calibration adjustments at the outset of utilizing this apparatus, the dimension retrieval accuracy of objects will improve, and the cumulative effect of errors in laser mispointing will be minimized. From the geometry of the image of FIG. 5, the effective baseline 508 due to the mispointing angle is:

$$b = b_0 + D \tan(\theta) \qquad \text{equation 1}$$

where: b is the effective baseline 508, $b_0$ is the baseline 502, the distance between the center of the camera's image sensor, and laser source), $\theta$ is the mispointing angle 506, and D is the shortest distance 509 between the laser source and object. The effective baseline is a function of distance D, 509 to the object 507.

In one embodiment, to estimate the values of the baseline 502 and mispointing angle 506 of the laser source(s) requires at least two calibration images, where each image has the laser source(s) projecting onto an object whose distance to the camera is known. These images, each provide M×M crossline locations: $\{p_x, p_y\}$, where M is the number of laser sources, and $p_x$, $p_y$ are the coordinates of the pixel at the crossline center along the x and y axes of the image respectively.

While the disclosed apparatus and methods refer to use of one camera, it could be beneficial to utilize two cameras. In this example, estimates of the baseline 502 and mispointing angle 506 of the laser source(s) may be retrieved from two images, where each image has the laser source(s) projecting onto an object whose distance to the camera is known. The two images are acquired by two cameras whose relative separation is known, via the camera calibration process, for example. One or more than one camera can provide results, however, two cameras may provide better results.

For one image (acquired in the first embodiment) the relationship between the known distance, and pixel coordinates of the crosslines along the x-axis and y-axis, for each laser i are:

$$\frac{f_x b_x^i}{p_x^i - c_x} = D, \; i \in N \text{ and } 0 \leq i < M^2, \qquad \text{equation 2}$$

$$\frac{f_y b_y^i}{p_y^i - c_y} = D, \; i \in N \text{ and } 0 \leq i < M^2,$$

where: $f_x$, $f_y$ and $c_x$, $c_y$ are the focal lengths and location of the camera's image plane center along the x and y-axis of the image plane respectively, $p_x^i$, $p_y^i$ are the coordinates of the pixel at the crossline center along the x and y axes of this image respectively, D is the known distance between the camera and object onto which the laser beams are directed, and $b_x^i$, $b_y^i$ are the effective baselines along the x and y-axis respectively.

For another image, the relationship between the known distance, and pixel coordinates of the crosslines along the x-axis and y-axis, for each laser i are:

$$\frac{f_x b_x^i}{p_x^{i\prime} - c_x} = D', \; i \in N \text{ and } 0 \leq i < M^2, \qquad \text{equation 3}$$

$$\frac{f_y b_y^i}{p_y^{i\prime} - c_y} = D', \; i \in N \text{ and } 0 \leq i < M^2,$$

where: $f_x$, $f_y$ and $c_x$, $c_y$ are the focal lengths and location of the camera's image plane center along the x and y-axis of the image plane respectively, $p_x^i$, $p_y^i$ are the coordinates of the pixel at the crossline center along the x and y axes of this image respectively, D' is the known distance between the camera and object onto which the laser beams are directed, and $b_x^i$, $b_y^i$ are the effective baselines along the x and y-axis respectively.

Combining expressions: equation 1, equation 2 and equation 3 allow estimation of the baseline ($b_0$) and mispointing angle ($\theta$) of the laser sources, shown here for the x-axis (but is analogous for the y-axis) for each laser i, as:

$$b_{0,x}^i = \frac{1}{f_x}\left[\frac{DD'(p_x^i - p_x^{i\prime})}{D' - D}\right], \text{ and } \theta_x^i = \arctan\left(\frac{D'(p_x^{i\prime} - c_x) - D(p_x^i - c_x)}{f_x(D' - D)}\right).$$

Repeating this process for all M×M crosslines, and independently for the x and y pixel coordinates, we get a total of $M^2$ baseline distances, and $M^2$ mispointing angles for the x and y axes respectively.

Knowledge of the baselines, and mispointing angles for the laser sources, once estimated, can be applied to estimate object dimensions from an image of the object onto which the laser pattern is projected. One example of a method for estimating object dimensions using a calibrated camera and laser system and an image of the object onto which the laser pattern is projected is described.

Given an image of the object with a projected laser pattern, the pixel coordinates of the $M^2$ crosslines for the x and y axes separately provide us with $2M^2$ estimates of distance between the camera and box as:

$$D_x^i = \frac{f_x \cdot b_{0,x}^i}{(p_x^i - c_x) - f_x \tan(\theta_x^i)}, \text{ and } D_y^i = \frac{f_y \cdot b_{0,y}^i}{(p_y^i - c_y) - f_y \tan(\theta_y^i)}$$

Ideally, the distance estimate for the same crossline from the x and y coordinates would be equal, i.e. $D_x^i = D_y^i$. However, in practice $D_x^i \neq D_y^i$, but these two distances provide two samples of the same distance. A single distance estimate for each crossline is retrieved by combining these two estimates from the x and y coordinates into one by weighting their values by the length of the corresponding baseline (the longer the baseline, the more accurate the height estimate):

$$D^i = \left(\frac{2b_{0,x}^i}{b_{0,x}^i + b_{0,y}^i} D_x^i + \frac{2b_{0,y}^i}{b_{0,x}^i + b_{0,y}^i} D_y^i\right).$$

Applying this weighted average method reduces $2M^2$ estimates of distance to $M^2$ estimates.

Alternatively, the relationships in equation 2 and 3 between the pixel coordinates, and known distances, may be combined into a single expression for distance by combining all the x and y coordinate measurements as: $\sqrt{x^2+y^2}$. For example, the x and y coordinates of the pixel locations are combined into a single location as: $p^i - c = \sqrt{(p_x^i - c_x)^2 + (p_y^i - c_y)^2}$. This combination of x and y coordinates will provide a single distance estimate for each crossline location, i.e. $M^2$ estimates.

In the case that the top surface of the object is flat, the final distance between the camera and object can be estimated as:

$$D = \frac{1}{K}\sum_{i=0}^{K-1} D_i,$$

where K indicates that a filter is applied to remove any estimates of distance that are anomalously different, or that are at ground level (for example, when one of the cross hairs does not lie on the box surface).

Finally, the object height is found by subtracting the retrieved distance D from the known distance between the camera and ground:

object height=$D_{ground}$-D.

Figure 6:
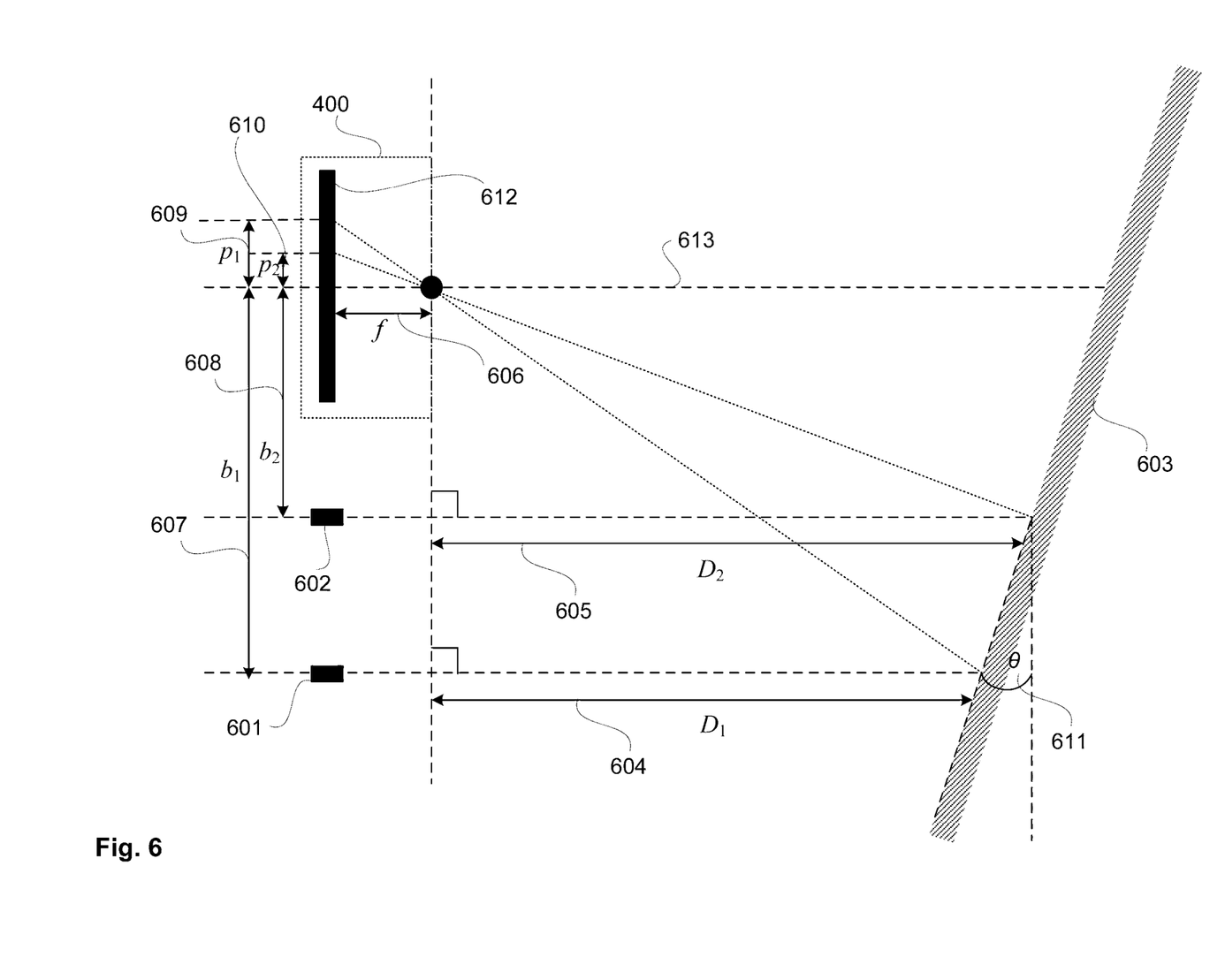
FIG. 6 shows slope estimation retrieval geometry.

The described methods can be applied to estimate the distance between the laser(s) and the object, and can also be applied to detect the relative angle between the baseline and the object, for example, in the event that the surface of the object is sloping as shown in FIG. 6. In order to measure the relative angle of inclination 611 between the object 603 and the camera image plane 612, a distance measurement should be made at, at least two different baselines. As an example, the distance measurements can be enabled by having two laser sources (601, and 602) whose baselines 607 and 608 are known/measured via the calibration method described above. Applying the triangulation method, the distance between the laser sources 601, and 602, and the object are estimated:

$$D_1 = \frac{f \cdot b_1}{p_1}, \text{ and } D_2 = \frac{f \cdot b_2}{p_2}$$

where: f is the focal length of the camera 606, $D_1$ 604 and $D_2$ 605 are the distances between the lasers 601 and 602 respectively, $b_1$ 607 and $b_2$ 608 are the baselines for the lasers 601 and 602 respectively, and $p_1$ 609 and $p_2$ 610 are the distances between the center of the image plane (principal point, 613) and the reflected laser dot location in the image of the scene taken by the camera.

From the geometry of FIG. 6, the angle of inclination of the object 611 is determined by:

$$\tan\theta = \frac{D_1 - D_2}{b_1 - b_2}.$$

Figure 7:
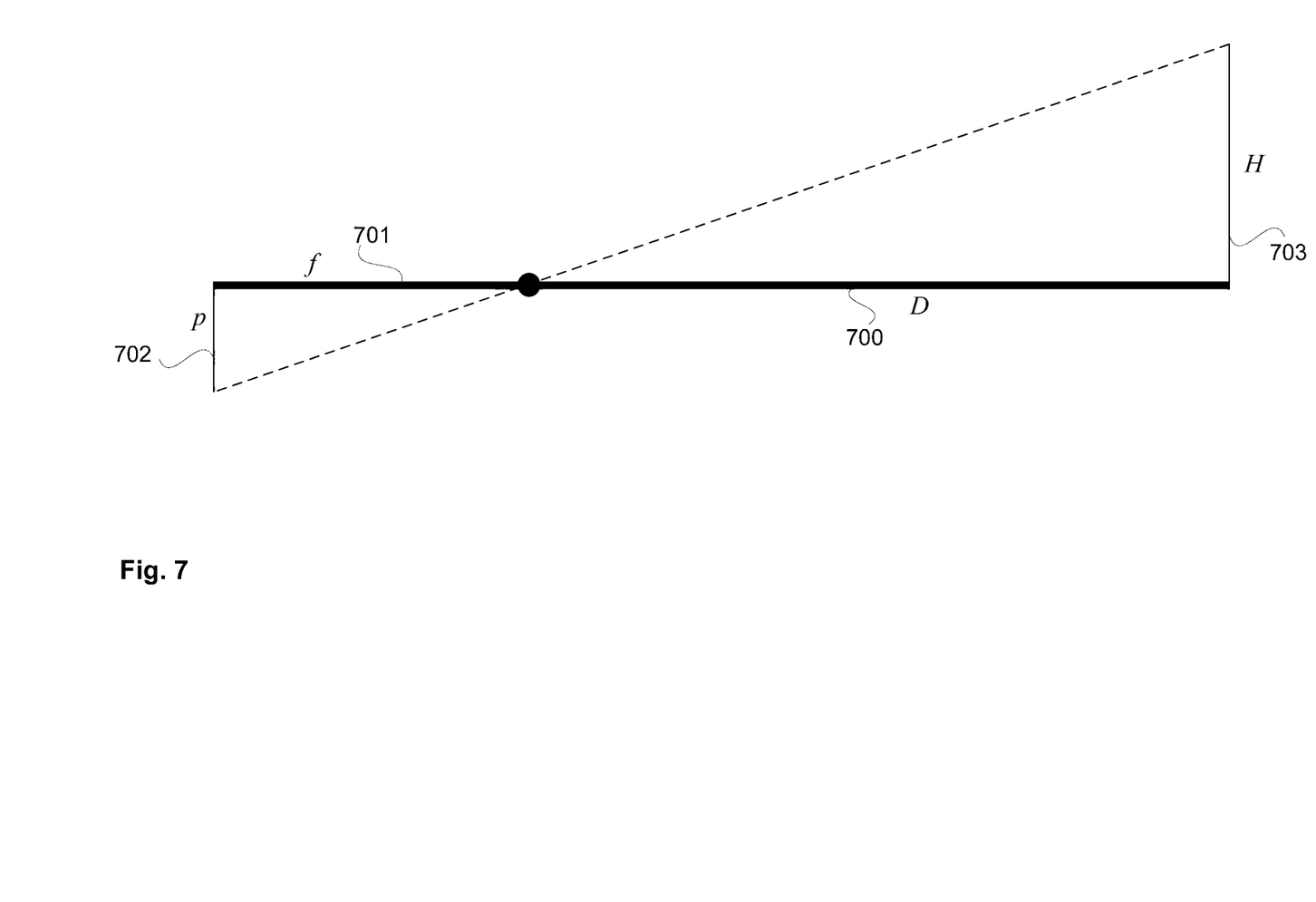
FIG. 7 shows a pin-hole camera model.

Knowing the distance between the camera and object top surface permits a means to convert the pixels of the image of the object to real-world lengths. The conversion between pixels and real-world lengths can be based on the pin-hole approximation for the camera (which is valid once the camera is calibrated) shown in FIG. 7. The pixels of objects in the image can be converted to real-world lengths (such as millimeters) via the pinhole camera equation:

$$H = \frac{D}{f} p [mm],$$

where: D 700 is the estimated distance between the camera and object surface, f 701 is the focal length of the camera, p 702 is a side length of the object in the image in pixels, and H 703 is the real-world length of the object side.

Figure 8:
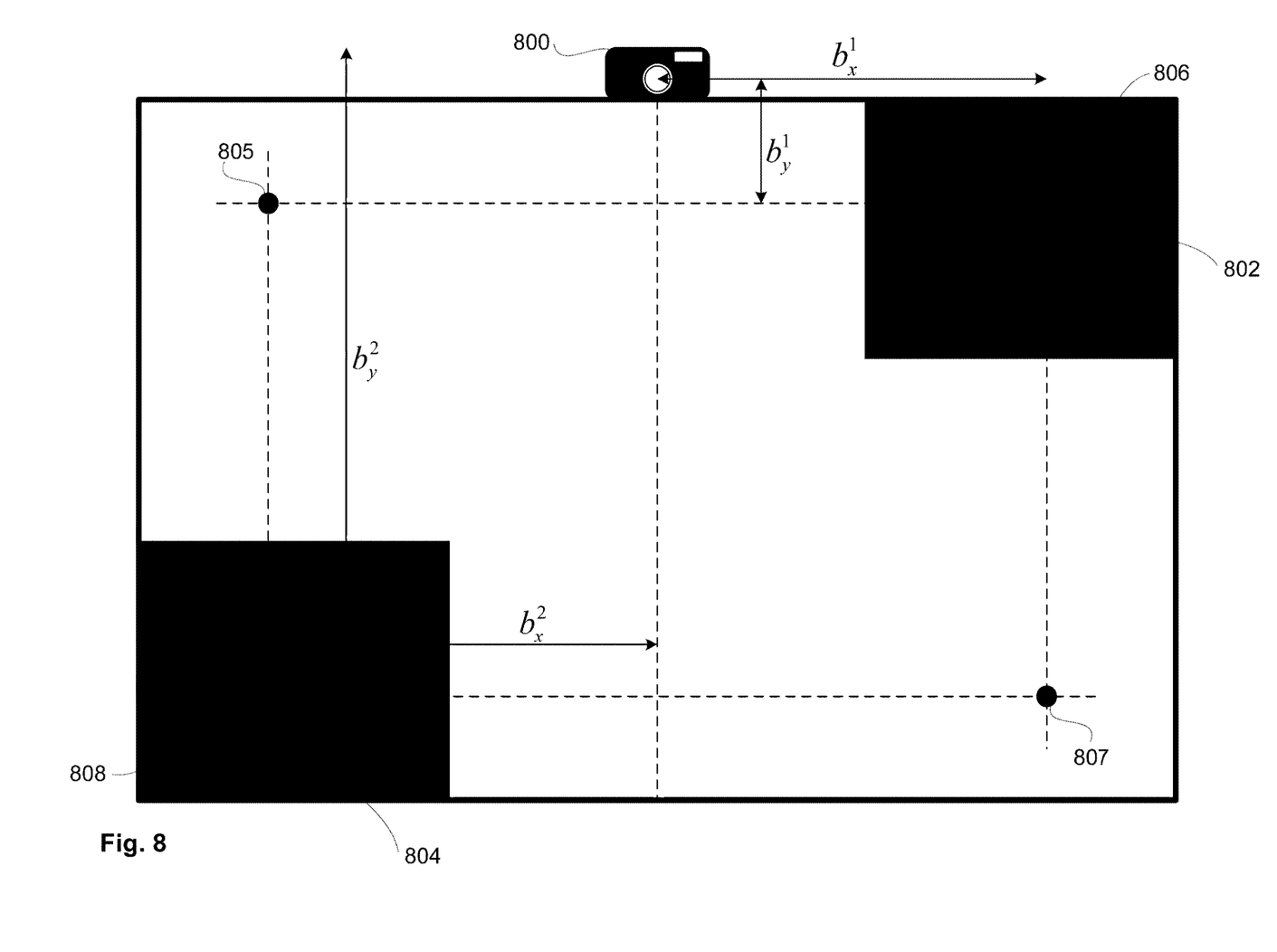
FIG. 8 shows an embodiment of volumetric estimation device with two laser sources and a single camera.

FIG. 8 shows an example volume-based measurement device that is mounted parallel to the ground and has a camera 800 and two laser sources 802, 804. The height of the object is derived from the difference in distance between the known mounting height of the camera and the distance measured to the object. The height of the object is measured by calculating the difference between the estimated distance of the object and the known height of the mounted camera.

For the two laser source example device, the corresponding two projected crosslines create four crossline locations, two of which are originally projected by the laser sources and the other two of which are created by the intersection of the laser projections. To calculate the height of the object to be measured, a processing technique, examples of which are described, is used to locate the four crossline locations in pixels in the x-coordinates and y-coordinates independently. The focal length, image size, and pixel size of the camera is known. The distance between the laser sources and the projected four crosslines is calculated from the known focal length, image size, and pixel size of the camera and the x-coordinates and y-coordinates identified from the projected four crossline locations in the laser pattern.

The laser lines projected onto the object to be measured "break" at a height change across their path. The break points of the laser lines are used to determine the outline of the object to be measured and can then be used to determine the dimensions of a minimum bounding area that encloses the surface of the object to be measured onto which the laser pattern is projected. The reflected light from the object's surface onto which the laser pattern is projected determines the break points from which the area of the surface can be measured. For the devices in which the laser sources are positioned above the object to be measured, the surface area of the top surface of the object to be measured can be calculated. Other surfaces can also be used to calculate the surface area.

From the determined height and measured surface area of one surface of the object to be measured, the volume-based measurement devices then determine the minimum bounding box, if one is being used, and/or the true dimensions of the object to be measured. The minimum bounding box is determined from the independently calculated x-coordinate and y-coordinate pixels from the captured image of the projected laser pattern. Further, the device separately measures the length of the object in pixels of both the horizontal and vertical projected laser lines on the object and relates the pixels to absolute lengths of the object in mm.

Similarly, the dimensions of the object to be measured can also be calculated from the independently-calculated x-coordinate and y-coordinate pixels from the captured image of the projected laser pattern by using the known size of the projected laser pattern, which is the distance between the four crosslines. Each pixel in the image can be correlated to a measured distance, such as a pixel to meter conversion from the captured image. The dimensions of the object to be measured are mapped from the pixel to meter conversion. The dimensions can be used to determine, in meters for example, the minimum bounding box for the object to be measured.

The lengths of the laser light lines from the laser to the surface of the object is also known, which be used to determine whether the object is inclined and if so how much. The change in angle of the object's surface at its edges causes discontinuity of the laser light lines, which causes them to "break," as discussed above. Using the fixed distance between the camera and the object to be measured along with the break lines that are caused by the inclination, if any, of the object, are used to measure the inclination, the width, and the length of the object.

Figure 9:
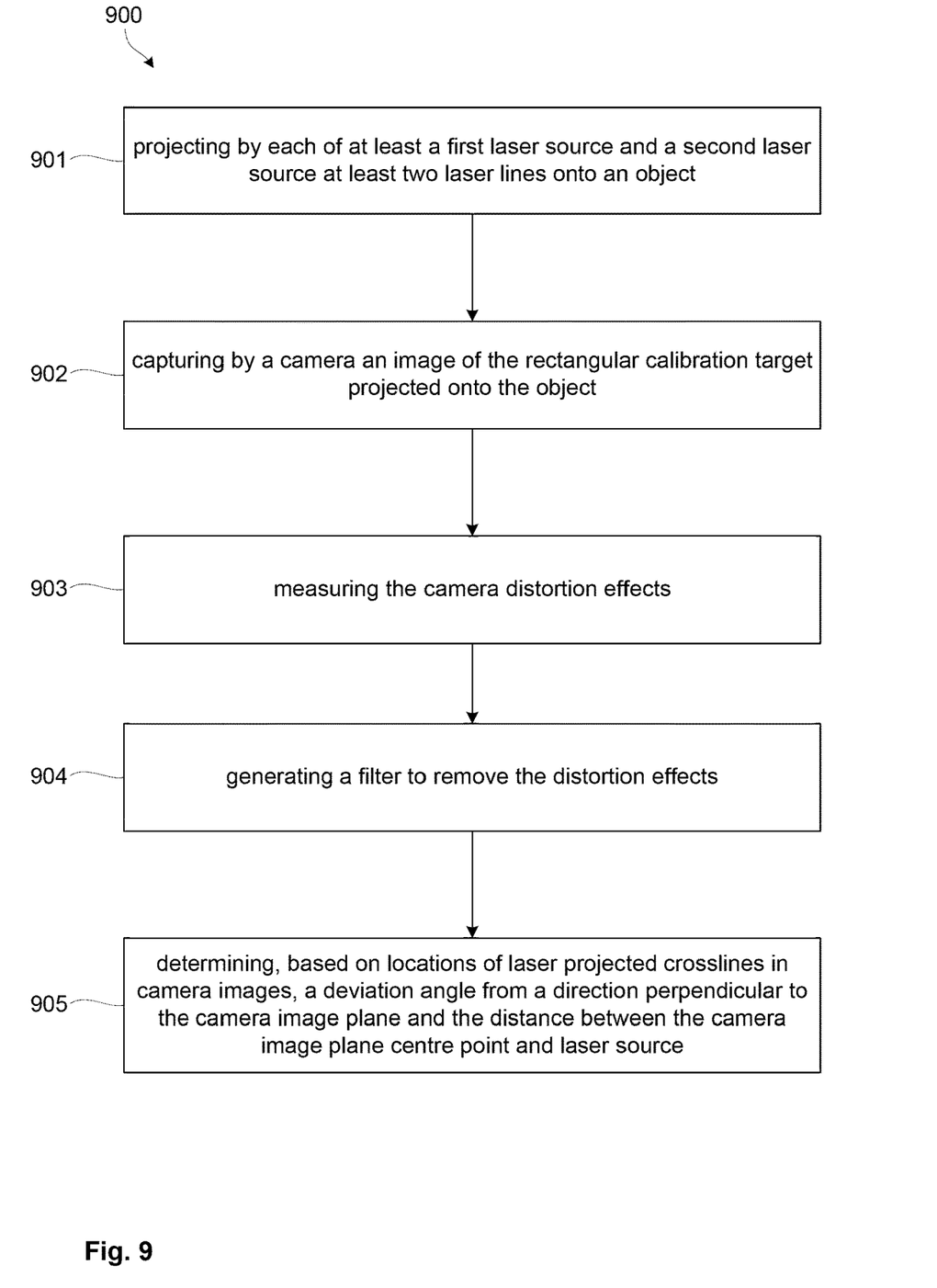
FIG. 9 illustrates a method for calibrating a volumetric estimation device for determining dimensions of an object.

FIG. 9 illustrates a method 900 for calibrating a volumetric estimation device for determining dimensions of an object. The method 900 comprises projecting 901 by each of at least a first laser source and a second laser source at least two laser lines onto an object from a point of laser projection, to form a rectangular calibration target having crossline locations on at least a portion of the object. The method 900 continues by capturing 902 by a camera an image of the rectangular calibration target projected onto the object, the camera having a camera image plane and a camera image plane centre point. The processor receives the images and measures 903 the camera distortion effects and generates 904 a filter to remove the distortion effects so that the camera approximates a pinhole camera model. The camera is configured to receive laser light. The camera image plane centre point and the points of projection of the laser sources are not collinear and wherein the point of laser projection from at least one of the a first laser source and a second laser source generating projected crosslines are not collinear with the camera image plane centre point so that at least one of a first distance between the camera image plane centre point and a first laser source and a second distance between the camera image plane centre and a second laser source is unknown.

Method 900 further comprises determining 905 by the processor, based on locations of laser projected crosslines in camera images, a deviation angle from a direction perpendicular to the camera image plane and the distance between the camera image plane centre point and laser source. Based on the deviation angle from a direction perpendicular to the camera image plane and the distance between the camera image plane centre point and laser source, the processor can then determine the size and/or volume of the object. The method may further comprise transporting the object depending on the size and/or volume, such as combining objects into containers to optimise the use of the container volume.

While a number of methods and apparatus' have been described to utilize locations of laser projected crosslines in camera images for determining a deviation angle from a direction perpendicular to the camera image plane and the distance between the camera image plane centre point and laser source, such are not intended to limit the scope of the disclosure. Providing a high quality volumetric estimation device for the large number of shippers worldwide is beneficial to the industry and consumers. The above-discussed manner to construct, for example from off-the-shelf parts, and tune, an apparatus for volumetric estimation of shipment items, and assure accurate measurement in an efficient manner provides benefits to all aspects of the freight shipping process, including decreasing revenue leakage experienced by carriers and increasing cost certainty for receivers of shipments in a streamlined and inconspicuous manner.

Any one or more of the above aspects of freight methods, devices, and systems or anything else can be embodied in software to help dimension the freight and/or help management, track, regulate, audit, or otherwise monitor freight traffic in any desired manner. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An apparatus for calibrating a volumetric estimation device for determining dimensions of an object, comprising:
   at least a first laser source and a second laser source, each, generating a laser beam to project at least two laser lines onto an object at a known distance from a respective point of laser projection, to form a rectangular calibration target having crossline locations on at least a portion of the object;
   a camera for capturing an image of the rectangular calibration target projected onto the object, the camera having a camera image plane and a camera image plane centre point;
   a processor configured to calibrate the camera to measure camera distortion effects to generate a filter to remove the distortion effects so that the camera approximates a pinhole camera model;
   wherein the camera image plane centre point and the points of projection of the laser sources generating projected crosslines are not collinear so that at least one of a first distance between the camera image plane centre point and a first laser source and a second distance between the camera image plane centre and a second laser source is unknown; and
   wherein the processor is further configured to: utilise locations of laser projected crosslines in camera images to calculate a deviation angle of the at least one of the laser beams from a direction perpendicular to the camera image plane and the distance between the camera image plane centre point and each laser source.

2. The apparatus of claim 1 wherein the processor is further configured to combine and process coordinates of the crosslines.

3. The apparatus of claim 1 wherein two or more images acquired by a camera of the projected laser crosslines, fall on objects at known distances away from the camera, and the processor is further configured, from the two or more images, to use the locations of crosslines to calculate the deviation angles of the laser beam from a direction perpendicular to the camera image plane and the distances between the camera image plane centre point and laser sources.

4. The apparatus of claim 1, further comprising a scale to weigh the object.

5. The apparatus of claim 1, further comprising a reader to read an identifying code on the object.

6. A method for calibrating a volumetric estimation device for determining dimensions of an object comprising:
   generating a laser beam to project by each of at least a first laser source and a second laser source at least two laser lines onto an object at a known distance from a respective point of laser protection, to form a rectangular calibration target having crossline locations on at least a portion of the object;
   capturing by a camera an image of the rectangular calibration target projected onto the object, the camera having a camera image plane and a camera image plane centre point; measuring camera distortion effects;
   generating a filter to remove the camera distortion effects so that the camera approximates a pinhole camera model, wherein the camera image plane centre point and the points of projection of the laser sources are not collinear so that at least one of a first distance between the camera image plane centre point and a first laser source and a second distance between the camera image plane centre and a second laser source is unknown; and
   calculating, based on locations of laser projected crosslines in camera images, a deviation angle of the at least one of the laser beams from a direction perpendicular to the camera image plane and the distance between the camera image plane centre point and laser source.

7. The method of claim 6, further comprising combining and processing the coordinates of the crosslines.

8. The method of claim 6 wherein two or more images acquired by a camera of the projected laser crosslines, fall on objects at known distances away from the camera, and the method further comprises calculating, based on the locations of crosslines from the two or more images, the deviation angles of the laser beam from a direction perpendicular to the camera image plane and the distances between the camera image place centre and laser sources.

9. The method of claim 6, wherein the object is a shipment item.

10. The method of claim 6, wherein the method further comprises determining at least one dimension of the object based on the deviation angle of the laser beam from a direction perpendicular to the camera image plane and the distance between the camera image plane centre point and laser source.

11. The method of claim 10, wherein the method further comprises storing the at least one dimension of the object in a database.

12. The method of claim 6, wherein the method further comprises identifying the object.

13. The method of claim 6, wherein the method further comprises calculating an effective baseline based on the deviation angle.

* * * * *